Sept. 18, 1962  J. J. GERBER  3,054,626
AUTOMATIC WAGON CHANGER
Filed May 11, 1960  4 Sheets-Sheet 3

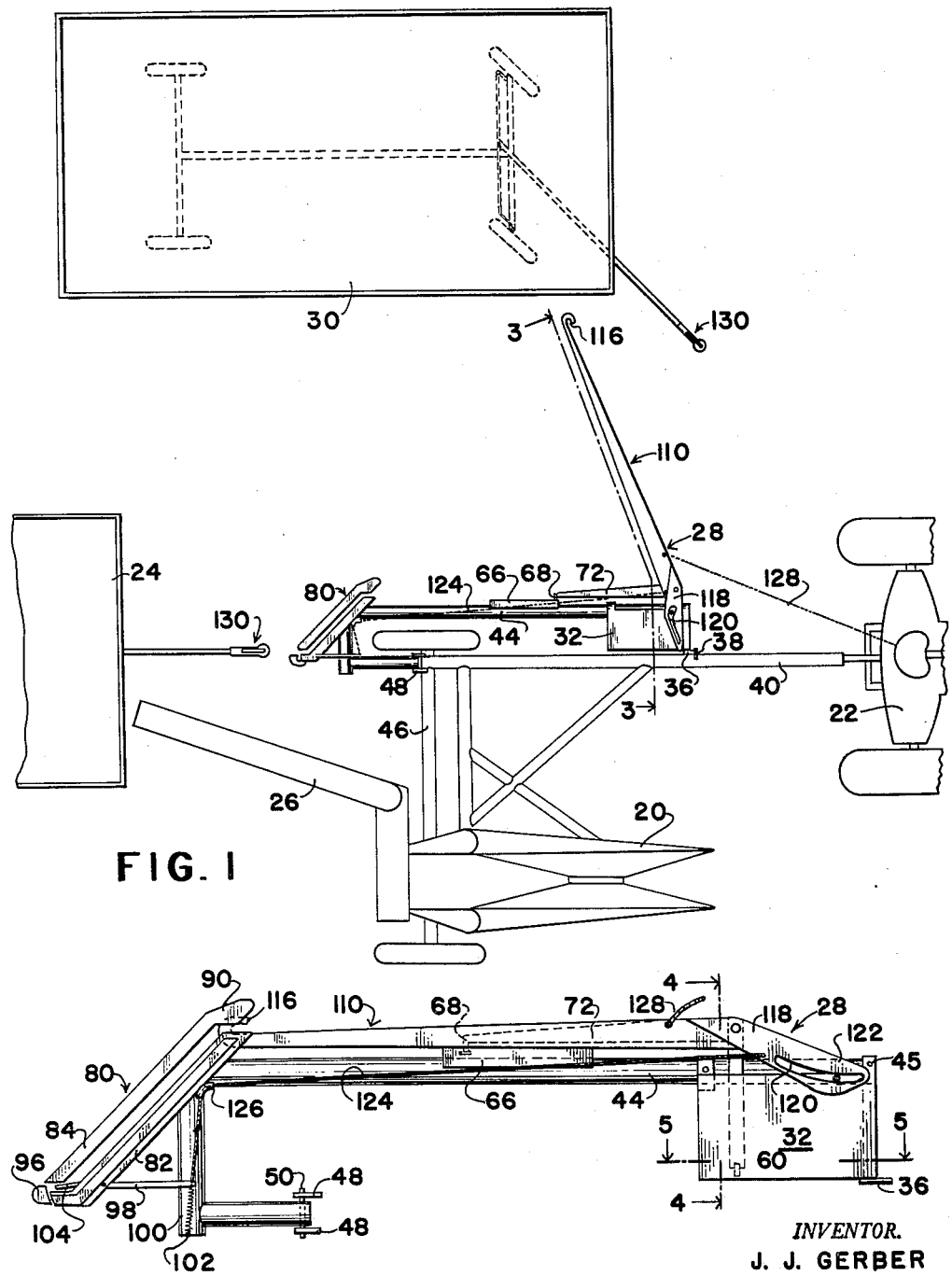

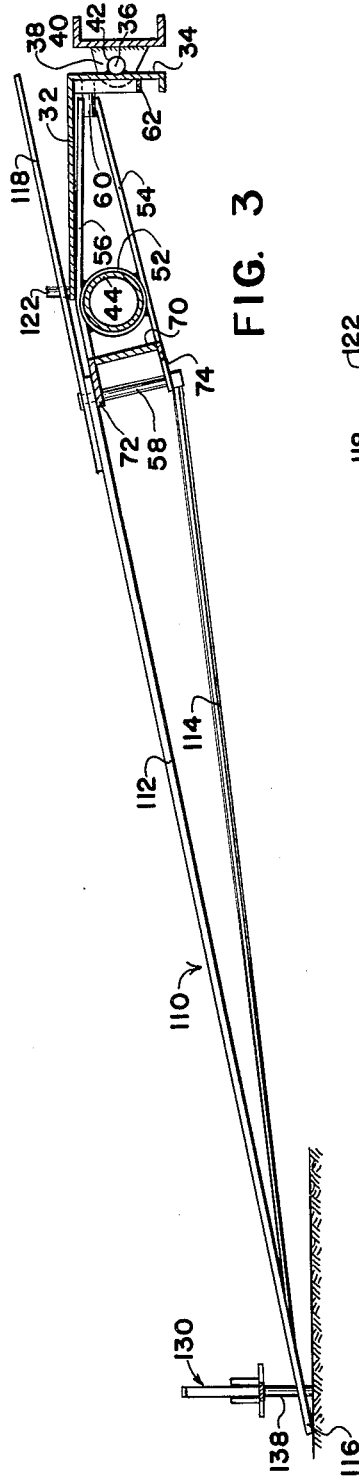
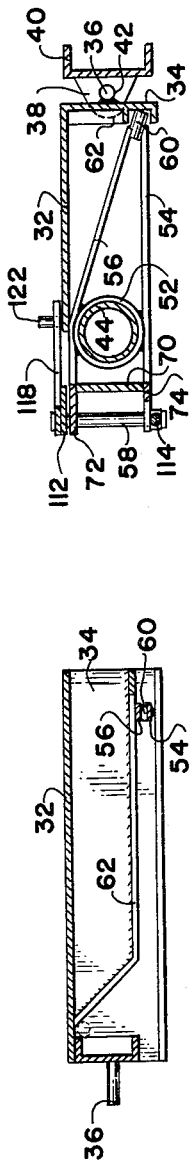
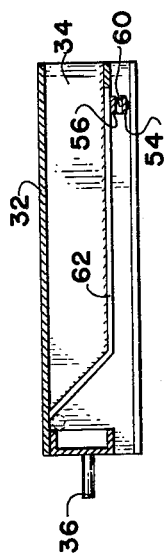
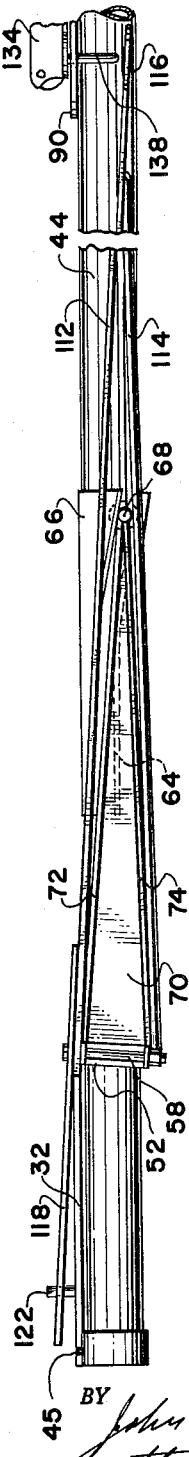

*INVENTOR.*
J. J. GERBER
BY John H. Widdowson
attorney

Sept. 18, 1962 J. J. GERBER 3,054,626
AUTOMATIC WAGON CHANGER
Filed May 11, 1960 4 Sheets-Sheet 4

INVENTOR.
J. J. GERBER

BY John H. Widdowson
attorney

United States Patent Office 3,054,626
Patented Sept. 18, 1962

3,054,626
AUTOMATIC WAGON CHANGER
Jerome J. Gerber, Wichita, Kans.
(Murdock, Kans.)
Filed May 11, 1960, Ser. No. 28,479
7 Claims. (Cl. 280—478)

This invention relates to an automatic wagon changer. More particularly, the invention relates to means for automatically releasing one wagon and picking up another and securing it in a hitch to be pulled behind an implement or a tractor. Still more particularly, the invention relates to a construction whereby a wagon can be picked up by an implement or tractor and automatically positioned in a wagon hitch secured thereto while the implement or tractor is moving, and also includes means for automatically disengaging a wagon held in the hitch when a second wagon is picked up.

Heretofore various means have been provided for securing wagons or the like to the rear end or side of an implement so that farm crops being cut or picked by the implement can be fed through a conveyor chute directly into the wagon. The wagon is manually engaged in the hitch before the implement can proceed with its cutting or harvesting operation. These devices require the implement to be stopped while the full wagon is being disengaged, and the implement must be moved forward or the full wagon moved before an empty wagon can be secured to the implement. This involves a considerable amount of time and additional manpower, and causes a corresponding reduction in the total productive time the implement can be used during any working day. Furthermore, many of the devices of the prior art are permanently attached to the implement so that it is difficult, if not impossible, to use the same wagon attaching apparatus with more than one implement without a major dismantling and reassembling operation.

In accordance with the present invention a device has been constructed which eliminates the problems in the prior art. The preferred automatic wagon, sled, or the like, changer embodiment of the invention is designed so that a full wagon or sled can be disengaged from the hitching mechanism on the implement and an empty wagon automatically engaged in the hitching device without the necessity of the operator stopping the implement. Also, the present device is preferably constructed so that it can be removed from one implement and secured to another quickly and easily, and the automatic wagon changer can be used with various types of implements without any major alteration in the implement or the wagon changer.

The changer means of the invention is usable with means pulled by a vehicle of any type. It includes an arm pivotally mountable on the vehicle. A hitch is also mountable on the vehicle and is spaced from the arm. Means are provided to extend the arm to pick up the means pulled by the vehicle, which is then delivered to the hitch.

The preferred automatic wagon changer embodiment of the invention preferably includes a supporting mechanism preferably removably secured to a pulling vehicle. A hitching device is employed, preferably mounted on a support, and a latch closing the hitch is desirably used. An extendable arm is used, preferably mounted on the supporting mechanism, and it is preferably operatively connected so that as the arm is extended to receive the tongue of an empty trailer, wagon or sled the latch on the hitch is automatically opened and a full wagon is disengaged from the hitch. The extendable arm with the empty trailer or wagon engaged therein then guides the tongue of the empty trailer into the hitch mechanism and the latch is automatically closed to prevent the empty trailer from being accidentally released. The automatic wagon changer is preferably made mountable on an implement so that it can be easily removed therefrom. The device can be operated by the driver of the pulling vehicle without the necessity of the driver stopping.

Accordingly, it is an object of this invention to provide new changer means for vehicle towed or pulled means.

It is another object of this invention to provide changer means for wagons, trailers, sleds, and the like.

Another object of the invention is to provide a new wagon changing device whereby one wagon can be disengaged from the hitching mechanism and another wagon can be automatically received therein without the necessity of stopping the device.

Still a further object of the invention is to provide a new automatic wagon changer which can easily be mounted on or removed from an implement.

A further object of the invention is to provide an automatic wagon changer which can be used with many types of implements and which is easily mounted on and removed from the implements.

Another object of the invention is to provide an automatic wagon changer which automatically releases one wagon as another is picked up.

Various other objects, advantages and features of the invention will become apparent from the following discussion taken in connection with the accompanying drawings, in which:

FIG. 1 is a plan view showing a preferred specific embodiment of an automatic wagon changer of the invention mounted on an implement with the hook arm extended to receive an empty wagon as a full wagon is disengaged from the hitching mechanism.

FIG. 2 is an enlarged plan view of the automatic wagon changer with the hook arm in the closed position.

FIG. 3 is an enlarged view taken along the line 3—3 of FIG. 1 showing the front slide mechanism in cross section and the hook arm in elevation.

FIG. 4 is an enlarged cross section view taken along the line 4—4 of FIG. 2 showing the front slide mechanism when the arm is in the retracted position.

FIG. 5 is an enlarged cross section view taken along the line 5—5 of FIG. 2 showing the front slide track in elevation.

FIG. 6 is an enlarged partial side elevation of the device showing the hook arm in the closed position and released from the wagon pin.

Figure 8:
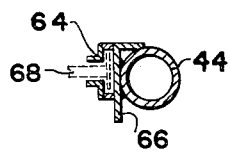
FIG. 8 is a cross section view taken along the line 8—8 of FIG. 7.
Figure 7:
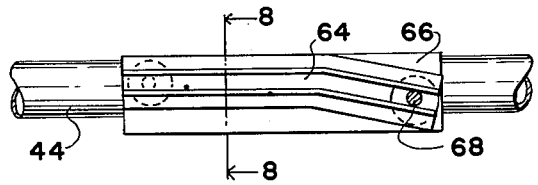
FIG. 7 is a side elevation of the rear slide or guide track.
Figure 10:
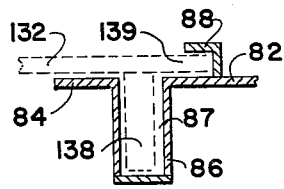
FIG. 10 is a cross section view taken along the line 10—10 of FIG. 9.

The following is a discussion and description of a preferred specific embodiment of the new automatic wagon changer of the invention, such being made with reference to the drawings wherein the same reference numerals are used to indicate the same or similar parts and/or structure. It is to be understood that such discussion and description is not to unduly limit the scope of the invention.

Referring now the the drawings in detail, an implement 20 is shown connected to and pulled by a tractor 22 in the usual manner. The implement 20 can be a corn picker, an implement of the type used for cutting maise, oats, alfalfa, or for bailing hay, etc. In fact, the implement can be of any type which pulls a farm wagon 24 behind the implement to receive the cut or harvested product. A conveyor chute 26 usually forms a part of the implement 20 and delivers the material from the implement to the wagon 24. When the wagon 24 is full it is pulled by another tractor, truck or the like to the storage bin or to market. Ordinarily the full wagon 24 must be manually released from the implement 20 and an empty wagon manually secured to the implement 20 while the device is stopped. According to the present invention an automatic wagon changer, shown generally at 28 is removably mounted on the implement 20 and is designed so that the full wagon 24 can be automatically disengaged from the implement and an empty wagon 30 automatically picked up and removably secured to the implement without the necessity of stopping the implement.

The automatic wagon changer 28 preferably includes a mounting plate 32 having an integral depending flange 34. A mounting pin 36 is secured to the flange 34 and extends from the forward edge of the flange. A mounting bracket 38 is secured to the implement framework 40 and projects from the side thereof. The mounting element 38 has an eye 42 therein dimensioned to receive the mounting pin 36.

An alongated supporting element, such as a tubular pipe 44, has one end portion secured to the bottom of a plate 32 by any suitable means, such as mounting bolts 45, welding or the like. The support or pipe 44 is generally U-shaped at the other end portion, as best seen in FIGS. 1 and 2. The axle 46 of the implement has two spaced brackets 48 rigidly secured to the back side thereof, such as by welding. The spaced members 48 have eyes therein which are aligned to receive a mounting pin 50 which passes through the spaced members 48 and the end of the U-shaped portion of the support or pipe 44. The pipe or support 44 can be made in one piece and bent intermediate its ends to form the U-shaped portion which surrounds the wheel of the implement 20, or it can be made from several separate pieces secured together into the desired shape. As will be apparent from the foregoing description, the automatic wagon changing device of the invention is easily and readily mounted on the implement 20 by merely passing the pin 36 through the eye 42 in the mounting bracket 38, and then positioning the end of the U-shaped portion of the support or pipe 44 between the spaced brackets 48 and passing the second pin 50 therethrough. Also, it is apparent that the device can be mounted on any implement merely by adding the mounting element 38 and the spaced members 48 to the implement 20, thus eliminating any costly conversion of the implement 20 to receive the automatic wagon changer 28. Obviously other means of mounting the device on an implement can be used if desired.

A relatively short tubular sleeve 52 surrounds the support or pipe 44 and is preferably loosely mounted to be slidable and rotatable thereon. The sleeve 52 is preferably positioned on the pipe or support 44 beneath the mounting plate 32 as shown in FIGS. 3, 4 and 6. A bracket assembly consisting of two spaced elements 54 and 56 is rigidly secured to the top and bottom of the sleeve 52, such as by welding, and extends from both sides of the sleeve. The outer end of the bracket assembly has a pivot pin 58 secured between the members 54 and 56.

A guide member 60, preferably circular in cross section, is secured to the inner end of the bracket assembly between the elements 54 and 56. The flange 34 of the mounting plate 32 has a track 62 formed on the surface of the flange facing the pipe or support 44. The track 62 is preferably inclined over the front portion of the flange 34, as seen in FIG. 5, and is generally horizontal and channel-shaped over the rest of its length. As the sleeve 52 moves longitudinally along the pipe 44 the circular guide member 60 will move along the track 62 on the flange 34.

A second track 64 is formed on a plate 66 which is secured to the pipe 44. The plate 66 is mounted on the support or pipe 44 so that the track 64 faces outwardly from the implement and it is positioned beyond the rear end of the sleeve 52 and spaced therefrom. The track 64 is generally horizontal over the front portion, or portion nearest the sleeve 52 and is curved or inclined downwardly at the rear end portion. A track follower 68 is mounted to move in the generally channel-shaped track 64 and preferably extends therefrom as thus shown in FIG. 8.

Two mounting members 70 and 72 are joined at their longitudinal edges, as best seen in FIGS. 3 and 4, and the members 70 and 72 are joined at one end to the elements 54 and 56 of the bracket assembly. The members 70 and 72 are secured at their other end portion to the extending portion of the track follower 68. A lip or flange 74 can be secured to the member 70 to project outwardly and be approximately parallel to the member 72. The members 70 and 72 will be moved by the bracket assembly as the sleeve 52 moves along the pipe or support 44.

Figure 9:
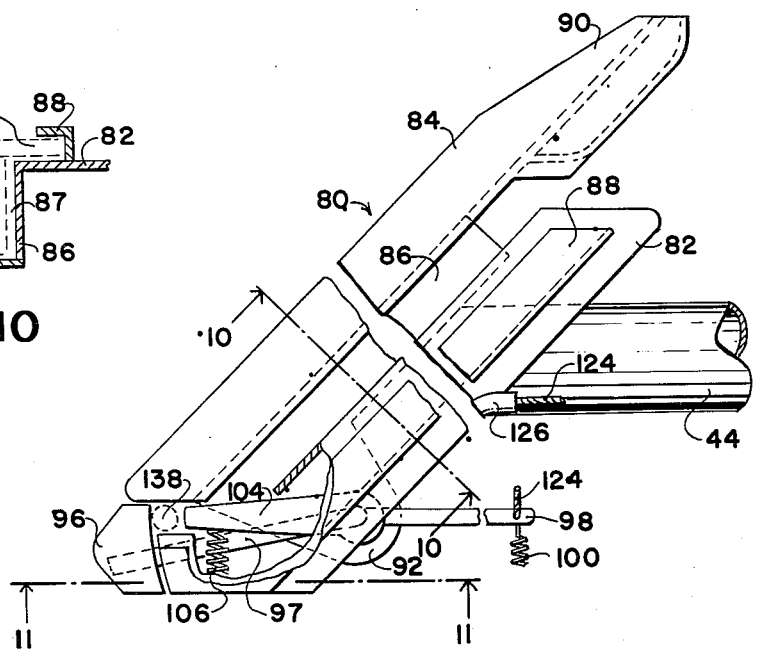
FIG. 9 is an enlarged plan view of the rear portion of the device showing the hitch mechanism.

The U-shaped portion or rear end of the pipe or support 44 has a wagon hitch mechanism shown generally at 80 secured thereto. The hitch is preferably constructed of spaced members 82 and 84 joined together by a U-shaped structure shown at 86 defining a channel 87. The hitch 80 is preferably mounted on the support 44 so that it extends diagonally from the side of the support 44 across the U-shaped portion thereof and extends beyond the rear of the U-shaped portion of the pipe 44. A lip or overhanging element 88 is secured to the portion 82 of the hitch and opens toward the portion 84. The member 84 extends to the side of the device further than the member 82, as best seen in FIG. 9, and the extending portion 90 extends across the open end of the channel 87. Extending portion 90 does not however close the channel 87 but merely makes it irregular, or forms a turn at the open end thereof.

The U-shaped structure 86 has a flange or projection 92 which extends from the lower edge thereof and is vertically spaced from the member 82. A pivot pin 94 is pivotally mounted between the members 82 and 92 and a rear door latch 96 is rigidly secured to the pivot 94 through a latch support 97 in any suitable manner, such as by welding. An operating bar 98 extends generally from the opposite side of the pivot 94 as the latch 96, and the bar 98 is rigidly attached to the pivot pin 94 or the latch support 97. Thus when the operating bar 98 is moved it will also cause the door latch 96 to be moved about the pivot 94 to open or close the hitch 80. A helical spring 100 is secured at one end of the operating bar 98, and the other end of the spring 100 is preferably secured to the pipe or support 44 at 102, as shown in FIG. 2. The end of the spring 100 can also be secured to any convenient portion of the implement 20 if desired. The force of the spring 100 biases the operating bar 98 so that the latch 96 is urged into the closed position.

Figure 11:
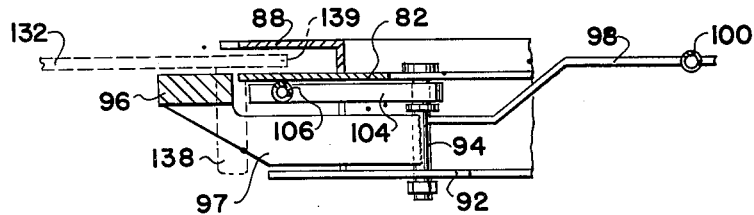
FIG. 11 is a cross section view taken along the line 11—11 of FIG. 9.
Figure 12:
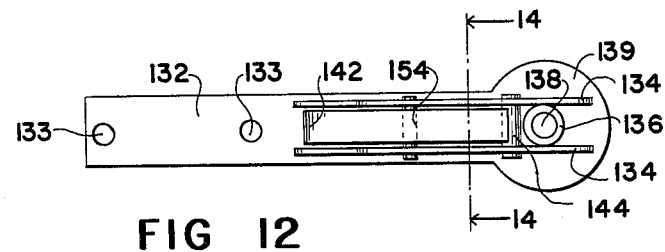
FIG. 12 is a plan view of the tongue of the wagon with the hook closed.

The support 97 which mounts the rear door latch 96 is preferably mounted beneath and spaced from the plane of the members 82 and 84 as shown in FIG. 11. A check latch 104 is loosely and pivotally mounted at one end on the pivot pin 94 and is spaced vertically above the support 97 and beneath members 82 and 84. The check latch 104 is mounted and dimensioned so as to be positioned across the end of the channel 87, and the free end of the check latch 104 is spaced from the rear door latch 96 as best shown in FIG. 9. Helical spring 106 is mounted between the end of the hitch channel 87 and the check latch 104 to continually urge the latch 104 across the channel. The free end of the latch 104 will contact the end of member 84 to limit its travel and prevent it from being moved out of the end of the channel 87.

An elongated extendable arm 110 is pivotally mounted at one end on the pivot pin 58. The arm 110 is preferably constructed of two separate elements, such as a flat plate 112 and a lower element 114 which can be either a rod as shown or another flat plate. The end of the arm 110 remote from the pivot pin 58 has a hook 116 thereon, which can be either integrally formed from one of the elements 112 or 114 of the arm 110, or it can be formed separately and secured thereto in any convenient manner. The elements 112 and 114 are preferably secured together at the end of the arm 110 near the hook 116 and provide support for the arm 110 particularly when it is in the extended position. The elements 112 and 114 are mounted on the pivot pin 58 outside of the bracket elements 54 and 56.

The arm 110 has an extension 118 which is mounted on the arm 110 to overlie the plate 32. A curved guide slot 120 is cut in the extension 118 and receives a guide rod 122 which is rigidly mounted on the plate 32. The rod 122 is preferably mounted on the edge of the plate 32 opposite from the flange 34 as best seen in FIG. 3. As the arm 110 and extension 118 move about pivot 58 and the arm is extended or retracted, the guide slot 120 and rod 122 act together to guide the movement of the arm 110, the sleeve 52, and the associated structure longitudinally along the pipe or support 44.

A rope or cable 124 is connected at its ends to the operator bar 98 and to the extension 118 of the extendable arm 110. The rope 124 can be passed around or through a suitable guide member 126 so that it will not interfere with the working parts of the implement 20. The guide 126 is shown as being a section of pipe or the like and bent intermediate its ends, however it can be a grooved pulley wheel, or any other suitable guiding structure. A second rope 128 is secured at one end to the extendable arm 110 between the hook 116 and the pivot 58, and its other end is removably secured to the tractor 22 so as to be readily available to the driver of the tractor. The ropes 124 and 128 are connected to the arm 110 and the extension 118 so that as the arm 110 is extended by the driver of the tractor pulling the rope 128, the rope 124 will move the operator bar 98 against the force of the spring 100 and will thus release the rear door latch 96. It will be obvious that the mounting of the rope 124 can be adjusted along the arm 110 or the extension 118 so that the releasing of the door 96 will take place as the arm 110 reaches any particular position during its extension.

The wagons 24 and 30 have structure, indicated generally at 130, on the tongue of the wagon which can be engaged by the hook 116 of the arm 110 and received by the hitch mechanism 80. This structure is shown in detail in FIGS. 12–15 and includes an elongated plate 132 which can be bolted at 133 or otherwise secured to the tongue of the wagons 24 and 30. The end of the plate 132 has a yoke of spaced supports 134 mounted thereon. A sleeve 136 is vertically mounted between the supports 134 in any suitable maner, such as by welding. An engaging pin 138 is removably mounted in the sleeve 136, such as by the pin 137, and projects from the bottom side of the plate 132 through a suitable opening. The end of the plate is enlarged as shown to provide an extending, generally circular flange 139.

A hook 140 having a flat upper portion 142 is pivotally mounted on the supports 134 by a pivot pin 144 which is preferably positioned near the top edges of the supports 134 and behind the sleeve 136. An opening 146 in the plate 132 allows the hook 140 to move through the plate 132 from the position shown in FIG. 15 to the position shown in FIG. 13. The hook 140 has two spaced mounting flanges 148 depending from the flat portion 142. Each of the flanges 148 has a mounting member 150 pivotally secured thereto and a U-shaped element 152 is rigidly secured between the members 150. A pivot pin 154 is mounted between the supports 134 just above the front edge of the opening 146. The pivot pin 154 pivotally mounts a pin or bolt 156 having a head 158 thereon and the bolt 156 passes through the U-shaped element 152 with the head 158 being engageable with the outside face of the center portion of the U-shaped member 152. A helical spring 160 surrounds the bolt 156 and is coaxial therewith. The ends of the spring 160 engage the pivot pin 154 and the inside of the center portion of the U-shaped member 152.

Figure 13:
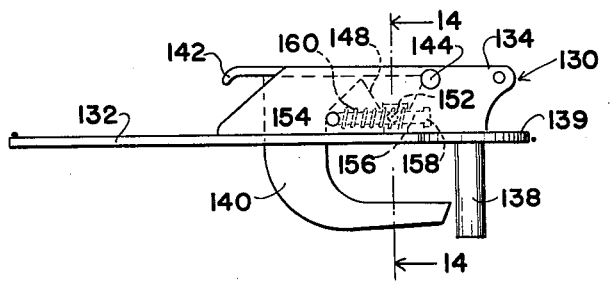
FIG. 13 is a side elevation of the tongue of the wagon with the hook closed.
Figure 14:
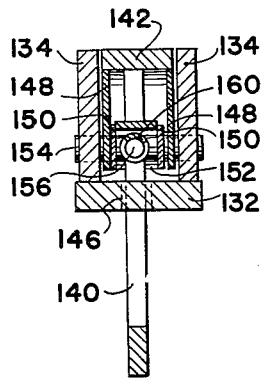
FIG. 14 is a cross section view taken along the line 14—14 of FIGS. 12 and 13.
Figure 15:
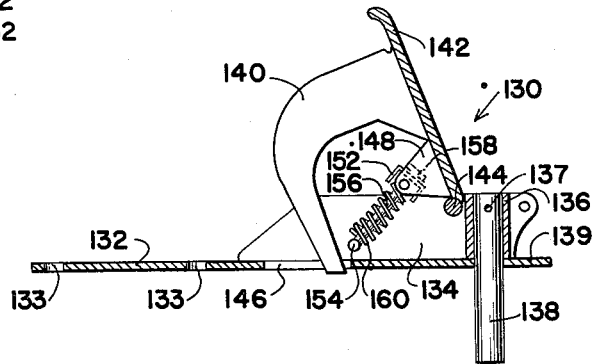
FIG. 15 is a longitudinal cross section view of the wagon tongue with the hook mechanism open.

In operation, as the hook 140 is moved from the closed position as shown in FIG. 13 to the open position as shown in FIG. 15, the force of the helical spring 160 will be directed against the inside face of the center portion of the U-shaped member 152, and this force will be transmitted through the mounting flanges 148 to the flat portion 142 of the hook 140 and thus urge it into the open position. The head 158 of the bolt 156 will engage the outside surface of the center portion of the U-shaped member 152 as the end of the hook 140 reaches the hole 146 in the member 132, thus limiting the upward movement of the hook 140. The U-shaped member 152 will engage the plate 132 when the hook 140 is closed, or in the position shown in FIG. 13, to limit the downward movement of the hook 140. The end of the hook 140 is preferably adjacent the engaging pin 138 when the hook is closed.

The structure 130 hereinbefore described which is mounted on the tongue of the wagons 24 and 30 is designed so that during normal operations with the automatic wagon changer 28 the structure will normally be in the position shown in FIG. 15. Then the hook 116 on the arm 110 will engage the engaging pin 138, and this pin will be received by the hitch mechanism 80 to mount the wagons 24 and 30 on the implement. When the wagons have been filled and released from the implement 20, the tongue of the wagon is mounted on a suitable hitch at the rear end of a tractor to be taken to storage bins, to the market, etc. During movement by the tractor, it will often be desirable to lock the wagon onto the tractor to prevent accidental disengagement therefrom. When this is desired, the hook 140 is urged through the hole 146 by the operator pressing on the flat portion 142 with his foot, which acts against the force of the spring 160, and the hook 140 is moved from the position shown in FIG. 15 to the position shown in FIG. 13. The hook 140 will then surround portions of the tractor hitching mechanism (not shown) and the full wagon can then be safely pulled. During the normal pulling operation, the pulling force of the tractor is directed against the engaging pin 138, but should the tractor and wagon be going down hill, or slowing down, the hitching mechanism on the tractor will be directed against the curved portion of the hook 140. It will be evident from the foregoing remarks that the wagon tongue is thus easily and removably mounted on the tractor with a minimum of time and effort.

With the automatic wagon changer 28 mounted on the implement 20 in the manner herein described, it is a very simple operation to replace a full wagon 24 with an empty wagon 30. The driver of the tractor 22 need merely extend the arm 110 by pulling the rope 128. As the arm 110 is extended, the extending portion 118 of the arm pulls the rope 124 against the force of the spring 100 which acts on the operator bar 98 to move the rear door latch 96 from the closed position. When the door latch 96 is opened, the pin 138 on the tongue of the full wagon 24 will be released and the weight of the wagon 24 will cause it to be disengaged from the channel shaped guide 87. As the arm 110 is moved to its furthermost position it is guided so that the hook 116 at the end thereof will be guided towards the engaging pin 138 on the tongue of the wagon 30. The movement of the arm 110 is guided by the guide slot 120 on the extending portion 118 of the arm as the slot moves along the projecting pin or rod 122. As the arm 110 is extended the sleeve 52 surrounding the pipe or support 44 will be urged forward along the pipe. As the sleeve 52 moves forward the associated structures secured thereto will, of course, also be moved forward. The associated structure includes the bracket assembly made up of the elements 54 and 56 which have the circular guide member 60 secured thereto. As the guide member 60 moves in the guide 62, it will first move horizontally, as best seen in FIG. 5, and when it reaches the forward portion of the guide 62 it will move along the inclined portion thereof. As the circular guide 60 moves along the incline portion of the guide 62 the sleeve 52 will be rotated a part of a revolution around the pipe or support 44, as will the pivot pin 58. Since the arm 110 is mounted on the pivot pin 58, it also will be moved about the axis of the pipe or support 44, causing the end having the hook 116 thereon to be lowered toward, and in some cases into engagement with, the ground. With the hook 116 near or riding along the ground it is in position to engage and receive the engaging pin 138 on the wagon tongue. As the tractor 22 continues to pull the implement 20 forward and the hook 116 engages and receives the pin 138, the drag or resistance of the empty trailer 30 will pull backward on the end of the arm 110 and cause it to move about the pivot pin 58. As the arm moves backward or into the retracted position it will again be guided by the slot 120 and the rod 122. Thus, the sleeve 52 will again be moved rearwardly or toward the hitch 80 and the circular guide member 60 will move from the inclined portion of the guide 62 into and along the horizontal portion of the guide 62 causing the sleeve 52 to rotate about the pipe 44. The arm 110 will thus be raised to its normal level as the sleeve 52 moves rearwardly and rotates. The dragging weight of the empty trailer 30 together with the guiding action of the slot 120 and the associated guide rod 122 will cause the arm 116 with the pin 138 engaged therein to be retracted to a position alongside the pipe or support 44 prior to the time that it completes its full rearward movement. Thus, the arm 110 reaches the retracted position alongside the pipe 44 before the guide follower 68 reaches the rear or inclined portion of the guide 64. As the arm continues its rearward movement caused by the dragging weight of the wagon 30 and the sleeve 52 continues its movement along the pipe 44, the guide follower 68 will reach and move into the inclined portion of the guide 64. As the guide follower 68 moves downwardly the mounting members 70 and 72 will, of course, also be urged downwardly and the member 70 or flange 74 will be placed in engagement with the element 114 forming a portion of the arm 110. This movement will also tend to move the sleeve 52 slightly out of its concentric mounting on the pipe or support 44, which is possible due to the loose mounting of the sleeve 52 on the support 44. This combined movement and urging by the member 70 causes the arm 110 to be urged downwardly, particularly at the end having the hook 116 thereon. The wagon tongue which has the plate 132 mounted thereon will be positioned over the projecting portion of the hitch 90 as the arm 110 reaches its retracted position. Then as the arm 110 continues to move rearwardly and is urged downwardly, the hook 116 will be disengaged from the engaging pin 138 on the wagon tongue since the tongue is prevented from moving downwardly with the hook 116 due to the engagement of the plate 132 with the top surface of the extending portion 90 of the hitch. By the time the hook 116 and pin 138 are disengaged the pin 138 will be positioned directly in front of the opening into the channel shaped hitch 80. The continued dragging force of the wagon 30 will cause the engaging pin 138 to move into and along the channel 87 between the members 82 and 84 into engagement with the check latch 104. The force exerted by the pin 138 against the check latch 104 is greater than the force of the spiral spring 106, thus the latch 104 is moved aside by the engaging pin 138 which then will move into engagement with the rear door latch 96. As the pin 138 engages the rear door latch 96 the check latch 104 will be released and again be positioned across the rear portion of the channel 87. The rear door latch 96 will, of course, have been returned to the closed position by the force of the spring 100 acting on the operator bar 98. The empty wagon 30 is then positively positioned within the diagonally extending hitch 80 and will be held in that position until the rope 124 again acts against the force of the helical spring 100 to again move the operator bar 98 and the rear door latch 96 to allow the pin 138 to move from the channel 87. The check latch 104 is positioned across the channel 87 and will prevent the pin 138 from moving backwardly out of the hitch 80 if the device be slowed down, or should it be pulled down an inclined surface. The circular portion 139 of the plate 132 is positioned between the members 82 and the lip 88 and prevents accidental disengagement of the tongue from the hitch in a vertical direction.

All of the preceding description of the wagon changing operation has been performed while the tractor 22 continues to pull the implement 20. The operation takes only a few seconds to perform and eliminates many minutes of down time.

The disengaged full wagon 24 will then be picked up by another tractor and secured thereto by lowering the hook 140 as previously described. The wagon 24 can then be unloaded at a storage bin and returned to the field and positioned in the manner shown in FIG. 1 for the wagon 30 so that it can again be picked up and filled. In some operations it may be economically feasible to equip the tractor pulling the full wagon 24 to the storage bins or the like with an automatic wagon changer similar to the one of the invention to thereby eliminate the time consumed by hitching and unhitching the loaded wagon onto the tractor.

The arm 110 and hitch 80 have been described as secured to the support 44, but it will be readily apparent that these elements can be secured directly to the vehicle.

While the invention has been described in connection with a preferred specific embodiment thereof and a specific structure has been described in connection with the apparatus on the tongue of the wagon, it will be understood that this description is intended to illustrate and not to limit the scope of the invention, which is defined by the appended claims.

It will be evident to those skilled in the art that various modifications of this invention can be made, or followed, in the light of this description and discussion, without departing from the spirit of the disclosure or the scope of the claims.

I claim:

1. An automatic wagon changer of the type described adapted to be mounted on a tractor pulled implement comprising, in combination, a mounting plate, an integral flange depending from said mounting plate, a mounting pin secured to and extending from the forward edge of said flange, a mounting element on the implement having an eye therein, said mounting pin being receivable in said eye of said mounting element, a guide rod mounted on and extending from the upper surface of said plate, said rod being positioned near the edge of said plate remote from said flange, an elongated tubular supporting pipe having one end portion thereof secured to the bottom of said plate, said pipe being U-shaped in the other end portion and secured at said other end portion to the rear axle of the implement at the back side thereof by a pin passing through said pipe and receivable by spaced members extending from said axle and mounted thereon, a tubular sleeve surrounding said pipe and being slidable and rotatable thereon, said sleeve being positioned on said pipe beneath said mounting plate, a bracket assembly rigidly secured to said sleeve and extending from both sides thereof, a pivot pin secured in the outer end of said bracket assembly outside of said mounting plate, a circular guide member secured to the inner end of said bracket assembly, a first track on said flange, said track being inclined over the front portion thereof and generally horizontal over the rest of its length, said circular guide member being mounted to move along said track on said flange, a second track secured to the side of said pipe beyond the rear end of said sleeve and spaced from said sleeve, said second track being curved downwardly at the rear end thereof and generally horizontal over the rest of its length, a track follower mounted in said second track and extending therefrom, two mounting members, said mounting members being joined at longitudinal edges and pivotally mounted at one end on said pivot pin and being secured at their other end to the extending portion of said track follower, a wagon hitch secured to the U-shaped portion of said pipe, said hitch being constructed of spaced members defining a diagonally extending channel, a pivotally mounted rear door latch closing the end of said channel, an operating bar rigidly secured to said latch, a first helical spring connected to said operator bar to bias said latch into the closed position, a check latch across said channel, a second helical spring mounted between the end of said hitch channel and said check latch biasing said check latch closed, an elongated extendable arm, an integral hook at the extended end of said arm, said arm being constructed of two separate elements secured together at the extended end of said arm and diverging therefrom and being vertically spaced apart and pivotally mounted on said pivot pin at the other end of said arm, said arm having an extension overlying said mounting plate, a curved guide slot cut in said extension, said extension being positioned relative to said arm so that said guide slot receives said guide rod on said plate to guide said arm in operation, a first rope operatively connected at its ends to said extension of said extendable arm and to said operator bar so that when said arm is extended said rear door latch is opened against the force of said first spring to release a wagon tongue held in said hitch, and a second rope secured to said extendable arm so that an operator on a tractor to pull said implement can pull said second rope to place said arm into the extended position to receive a wagon tongue in said hook, and as said arm is extended said guide member in said first track will cause said sleeve to move about the axis of said pipe to lower said arm, and said arm with said wagon tongue in said hook will move about said pivot pin until said nook and tongue are in front of the open end of said hitch channel and said rod on said plate is at the curve of said guide slot in said arm extension so that said arm will then move towards said hitch whereupon said elements of said guide arm will be engaged by said mounting members to force said arm downwardly, engaging said tongue in said hitch channel and disengaging said tongue from said hook, and said tongue will move along said hitch channel and pass said check latch to be positioned between said check latch and said rear door latch in pulling position.

2. An automatic wagon changer of the type described adapted to be mounted on a tractor pulled implement comprising, in combination, a mounting plate, a flange depending from said mounting plate, means on said flange to removably secure the mounting plate to the implement, a guide rod mounted on and extending from the upper surface of said plate, an elongated tubular supporting pipe having one end portion thereof secured to the bottom of said plate, said pipe being U-shaped on the other end portion and removably mountable at said other end portion on said implement, a tubular sleeve surrounding said pipe and being slidable and rotatable thereon, said sleeve being positioned on said pipe beneath said mounting plate, a bracket assembly secured to said sleeve and extending from both sides thereof, a pivot pin secured in the outer end of said bracket assembly, a guide member secured to the inner end of said bracket assembly, a first track formed on said flange, said track being inclined over a portion thereof and generally horizontal over the rest of its length, said guide member being mounted to move along said track on said flange, a second track secured to said pipe and spaced from said sleeve, said second track being curved downwardly over a portion of its length, a track follower movable in said second track, mounting members secured at one end to said track follower and at their other end to said bracket assembly, a wagon hitch secured to the U-shaped portion of said pipe, said hitch having a channel therein, a pivotally mounted rear door latch closing one end of said channel, an operating bar operatively secured to said latch, spring means connected to said operating bar to bias said latch into the closed position, a check latch mounted on said wagon hitch, second spring means engaging said check latch and biasing said latch closed, an extendable arm having a hook at one end thereof, said arm being pivotally mounted on said pivot pin, said arm having an extension overlying said mounting plate, a guide slot cut in said extension and receiving said guide rod on said plate, rope means connected to said arm to move said arm into the extended position to receive a wagon tongue in said hook, second rope means operatively connected to said arm and said rear door latch so that as said arm is extended said latch is opened, said device being constructed and adapted so that as said arm is extended said guide member in said first track will cause said sleeve to move about the axis of said pipe to lower said arm, and said arm with said wagon tongue in said hook will move about said pivot pin until said hook and tongue are in front of the open end of said hitch channel and said rod on said plate is at the curve of said guide slot in said arm extension so that said arm will then move towards said hitch whereupon said track follower in said second track will move into the inclined portion of said second track and urge said hook on said arm downwardly, thus disengaging said tongue from said hook and engaging said tongue in said hitch channel, and said tongue will then move along said hitch channel and pass said check latch to be positioned between said check latch and said rear door latch in pulling position.

3. An automatic wagon changer of the type described adapted to mounted on a tractor pulled implement comprising, in combination, a mounting plate, a guide rod on said plate, an elongated support having a U-shaped portion, said support being secured to said mounting plate, a sleeve mounted on and movable on said support, a pivot pin, means mounting said pivot pin on one side of said sleeve, an extendable arm, an integral hook at one end of said arm, said arm being pivotally mounted on said pivot pin at the other end of said arm, a guide slot cut in a portion of said arm to receive said rod on said mounting plate to guide said arm in operation, a wagon hitch secured to the U-shaped portion of said support, said hitch having a diagonally extending channel therein, a rear door latch with said wagon hitch closing the end of said channel, spring means biasing said latch into the closed position during the normal operation, and rope means operatively connected to said extendable arm and to said rear door latch so that as said arm is extended said door latch is opened against the force of said spring means, said device being constructed and adapted so that said extendable arm can be extended to engage and receive a wagon tongue in said hook and said arm will be guided so that said wagon tongue will be guided into said channel in said hitch and released from engagement with said hook and be retained in said hitch by said rear door latch during normal pulling operation.

4. An automatic wagon changer comprising, in combination, an elongated support, means to mount said support on an implement, a sleeve on said support, a pivot pin, means mounting said pivot pin on said sleeve, an extendable arm, said arm having a hook at one end thereof constructed to engage and retain a wagon tongue and being pivotally mounted on said pin at the other end thereof, a wagon hitch secured to said support and spaced from said sleeve, said wagon hitch having movable latch means closing same to retain a wagon tongue therein, said latch means being operatively connected to said arm so that when said arm is extended said latch means is opened and when said arm is retracted said latch means is closed, and rope means connected to said arm so that said arm can be extended to receive a wagon tongue in said hook, said device being constructed and adapted so that said arm with said wagon tongue therein will move from the extended to the retracted position, and said wagon tongue will be mounted in said hitch.

5. An automatic wagon changer comprising, in combination, a support, means to mount said support on a vehicle, a sleeve mounted on said support and being longitudinally and rotatably movable on said support, an extendable arm, said arm having a hook at one end thereof constructed to receive and retain a wagon tongue therein and being pivotally mounted at the other end thereof to be movable with said sleeve, a wagon hitch secured to said support and spaced from said sleeve, a rear door latch closing said hitch, and means operatively connected to said latch and to said arm so that as said arm is extended to engage and pick up an empty wagon said latch is disengaged to release a full wagon from said hitch and as said arm guides said empty wagon into said hitch said latch is returned to its normal position closing said hitch and retaining said wagon therein until said arm is again extended.

6. The device as recited in claim 5 additionally comprising guide means operatively connected to said sleeve to move said sleeve along and around said support as said arm is extended so that said hook on said arm will be accurately guided into engagement with the tongue of said empty wagon.

7. The device as recited in claim 5 additionally comprising guiding means secured to said support and engageable with said arm to disengage said arm from said wagon tongue as said wagon tongue is received in said hitch.

References Cited in the file of this patent
UNITED STATES PATENTS

| | | |
|---|---|---|
| 1,433,265 | Ferris | Oct. 24, 1922 |
| 2,904,349 | Frieberg | Sept. 15, 1959 |